(12) United States Patent
Schneider (10) Patent No.: US 9,727,875 B2
(45) Date of Patent: Aug. 8, 2017

(54) LEGITIMACY DETERMINATION OF REPORTED PROBLEMS

(71) Applicant: International Business Machines Corporation, Armonk, NY (US)

(72) Inventor: Haim Schneider, Ramot Meir (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 933 days.

(21) Appl. No.: 14/083,758

(22) Filed: Nov. 19, 2013

(65) Prior Publication Data
US 2015/0142681 A1    May 21, 2015

(51) Int. Cl.
| | |
|---|---|
| G06Q 30/02 | (2012.01) |
| G06Q 10/10 | (2012.01) |
| G06Q 10/06 | (2012.01) |
| G06Q 30/06 | (2012.01) |
| G06Q 10/08 | (2012.01) |
| G06Q 30/00 | (2012.01) |
| G06Q 50/26 | (2012.01) |
| G06Q 50/18 | (2012.01) |
| G06Q 50/16 | (2012.01) |
| G06Q 50/00 | (2012.01) |

(52) U.S. Cl.
CPC .......... *G06Q 30/018* (2013.01); *G06Q 50/01* (2013.01); *G06Q 50/163* (2013.01); *G06Q 50/18* (2013.01); *G06Q 50/26* (2013.01)

(58) Field of Classification Search
CPC ...... G06Q 30/018; G06Q 50/01; G06Q 50/18; G06Q 50/163
USPC .................................. 705/1.1–912
See application file for complete search history.

(56) References Cited

U.S. PATENT DOCUMENTS

| | | |
|---|---|---|
| 8,103,868 B2 | 1/2012 | Christensen |
| 8,265,241 B2 | 9/2012 | Rowe et al. |
| 8,301,719 B2 | 10/2012 | Wei et al. |
| 2011/0078761 A1 | 3/2011 | Kaario et al. |
| 2013/0002880 A1 | 1/2013 | Levinson et al. |
| 2013/0005294 A1 | 1/2013 | Levinson et al. |
| 2013/0007501 A1* | 1/2013 | Areal ............ G06Q 10/20 714/2 |
| 2014/0196529 A1* | 7/2014 | Cronin ............ E01C 23/01 73/146 |

OTHER PUBLICATIONS

Chua et al., Detecting News Event from a Citizen Journalism Website Using Tags, Wee Kim Wee School of Communications & Information, Nanyang Technological University, 2009, Singapore, 1 page.

(Continued)

*Primary Examiner* — Jonathan Ouellette
(74) *Attorney, Agent, or Firm* — Cantor Colburn LLP (57) ABSTRACT

Techniques for determining the legitimacy of a problem report are provided. Report data indicating a reported problem is received at a computer processor. Image data associated with the reported problem is identified, and metadata associated with the image data is identified. The legitimacy of the reported problem is determined based on the metadata in view of the report data.

20 Claims, 5 Drawing Sheets

400

(56) References Cited

OTHER PUBLICATIONS

GIS on the Rise in Citizen Engagement, by ESRI on Oct. 13, 2011, 6 pages. Downloaded off internet: http://www.slideshare.net/ESRI/gis-on-the-rise-in-citizen-engagement, 6 pages.
Improving Citizen Engagement, by ESRI on Sep. 20, 2011, 6 pages. Downloaded from internet: http://www.slideshare.net/ESRI/improving-citizen-engagement-gov-20, 6 pages.

* cited by examiner

LEGITIMACY DETERMINATION OF REPORTED PROBLEMS

BACKGROUND

The present disclosure relates to service requests in a service system. More specifically, the present disclosure relates to flagging service requests in a service system.

Some service systems, such as maintenance provided by government agencies (e.g., a local government of a city or town), enable users to provide service requests by sending image data of an issue that requires service. For example, some cities have implemented systems in which residents take photos of problems they encounter in their communities such as potholes, graffiti, obscured traffic signs, broken sprinklers, uneven sprinklers, and the like. Comments related to the problem are recorded and transmitted to the local government for review and response including repair of the reported problem.

SUMMARY

In one embodiment, a method is described herein. The method includes receiving report data indicating a reported problem and identifying image data associated with the reported problem. The method also includes identifying metadata associated with the image data and determining a legitimacy of reported problem based on the metadata in view of the report data.

In another embodiment, a computing device including a storage device and a processor is described herein. The storage device includes instructions that when executed by the processor cause the computing device to receive report data indicating a reported problem and identify image data associated with the reported problem. The instructions cause the computing device to identify metadata associated with the image data and determine a legitimacy of the reported problem based on the metadata in view of the report data.

In yet another embodiment, a computer program product is provided. The computer program product includes a computer-readable storage medium having program code embodied therewith. The program code is executable by a processor to perform operations. The operations include receiving report data indicating the reported problem, and identifying image data associated with the reported problem. The operations include identifying metadata associated with the image data and determining a legitimacy of the reported problem based on the metadata in view of the report data.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the disclosure are apparent from the following detailed description taken in conjunction with the accompanying drawings.

DETAILED DESCRIPTION

The subject matter disclosed herein relates to techniques for determining legitimacy of a received problem report. In recent years, many service providing organizations such as government municipalities have begun offering web and mobile tools for reporting non-emergency problems such as potholes, graffiti, abandoned cars, and the like. These tools are aimed to increase a citizen's engagement and help improve the city. In particular, applications for smartphones allow citizens to report a problem immediately when they encounter a problem in the city while walking or driving in the street. The citizen may mark the location of a problem on a map, provide textual data indicating the location or type of problem, or use a location automatically provided by the device by sensors such as a global placement system sensor, and optionally add image data such as a photo. A similar web interface allows reporting problems from a web page.

These systems may have benefits for cities and citizens. However, they may open the doors for spam, unjustified reports, fraudulent reports, mistaken reports, and the like. It may be important for a given service provider, such as a municipality, to detect such illegitimate reports, and avoid wasting resources on sending teams to fix an illegitimately reported problem.

A legitimate reported problem, as referred to herein, is a reported problem that is reported not as a result of fraud, mistake, spam, that is not unjustified, or any combination therein. An illegitimate reported problem, on the other hand, is a reported problem that is based on fraud, mistake, spam, that is unjustified based on given conditions, or any combination therein.

Figure 1:
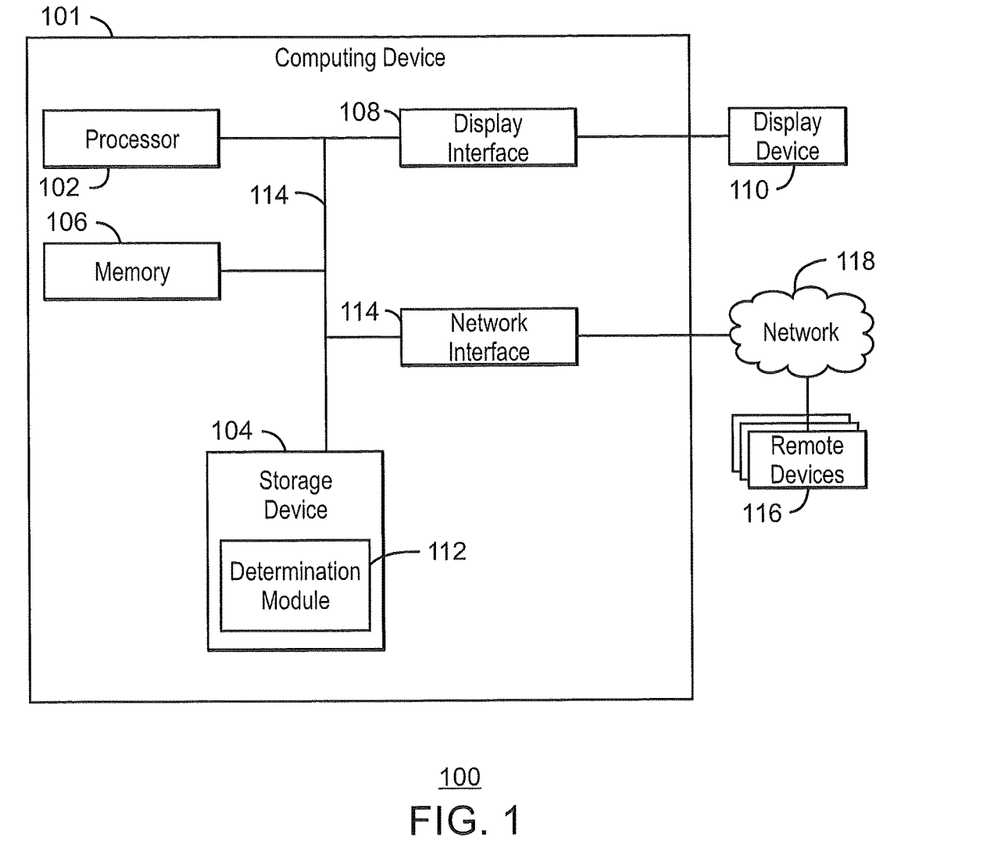
FIG. 1 is a block diagram of a computing system configured to receive data indicating a reported problem in accordance with an embodiment.

FIG. 1 is a block diagram of a computing system configured to receive data indicating a reported problem. The computing system 100 may include a computing device 101 having a processor 102, a storage device 104 comprising a computer-readable medium, a memory device 106, a display interface 108 communicatively coupled to a display device 110. The storage device 104 may include a determination module 112 configured to determine whether a reported problem is legitimate as discussed in more detail below.

In embodiments, the computing device 101 is a central computing device that may be used by a service provider such as a municipality, a housing organization, or any other service provider enabling problems to be reported to a service provider. In embodiments, the computing device 101 is a virtual machine implemented within the cloud computing environment and the determination module 112 may be implemented on one or more processing devices, such as the processor 102, piecewise throughout the cloud computing environment.

As illustrated in FIG. 1, the computing device may include a network interface 114 configured to enable one or more remote devices 116 to report problems to via a network 118. The remote devices 116 may include a smartphone, a personal computer, a tablet computer, and the like configured to report problems via the network 118.

The determination module 112 may be logic, at least partially comprising hardware logic. In embodiments, the determination module 112 may be implemented as instructions executable by a processing device, such as the processor 102. The instructions may direct the processor to receive data indicating a reported problem. The data indicating a reported problem may include data indicating a geo-location of the reported problem, the type of reported problem, among other types of data. In embodiments, the report data may be collection of fields associated with a given report. The data indicating a reported problem may include, or be associated with, image data. The image data may be a digital photograph, a video, and the like. The determination module 112 may identify metadata associated with the image data, and determine whether the reported problem is legitimate based on the metadata in view of the report data.

As discussed above, the determination module 112 may be logic, configured to carry out the instructions for determining the legitimacy of a reported problem. Alternatively or additionally, the determination module 112 may be a set of instructions implemented by the processor. The processor 102 of the computing device 101 of FIG. 1 may be a main processor that is adapted to execute the stored instructions. The processor 102 may be a single core processor, a multi-core processor, a computing cluster, or any number of other configurations. The memory unit 106 can include random access memory, read only memory, flash memory, or any other suitable memory systems. The main processor 102 may be connected through a system bus 114 to components including the memory 106, the storage device 104, and the display interface 108.

The block diagram of FIG. 1 is not intended to indicate that the computing device 101 is to include all of the components shown in FIG. 1. Further, the computing device 101 may include any number of additional components not shown in FIG. 1, depending on the details of the specific implementation.

Figure 2:
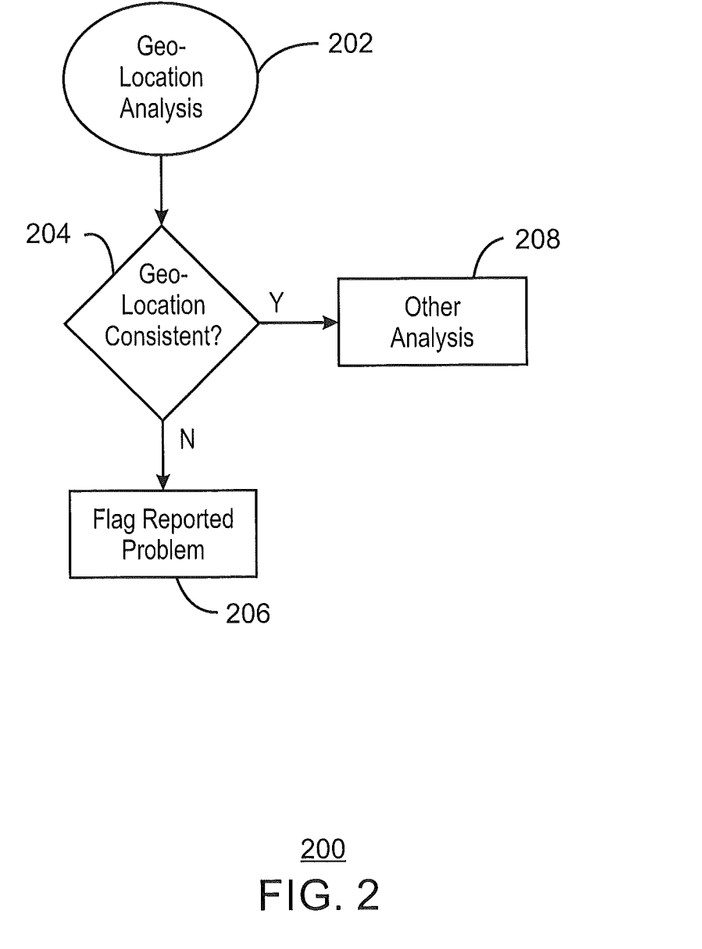
FIG. 2 is a flow diagram illustrating a determination of an illegitimate problem based on a geo-location analysis in accordance with an embodiment.

FIG. 2 is a flow diagram illustrating a determination of an illegitimate problem based on a geo-location analysis. In embodiments, the metadata and the report data may indicate geo-location data. At block 202, a geo-location analysis may begin. Based on the geo-location data, the geo-location analysis makes a determination of whether geo-location data of the metadata and the report data is consistent. For example, a reported problem may include report data indicating that a problem, such as a pothole, is located at a given location. The metadata associated with image data, such as a photo, may indicate that the location where the photo was taken is inconsistent with the location indicated in the report data. If the geo-location data is inconsistent, the geo-location analysis flags the reported problem as possibly being an illegitimately reported problem, as indicated at block 206. Optionally, if the geo-location data is consistent, other analysis may be performed at block 208, as discussed in more detail below. In embodiments, consistency of geo-location data may be based upon a threshold. For example, the geo-location data associated with the metadata and the geo-location data associated with the report data may be determined to be consistent if the distance between the two geo-locations indicated is within a threshold.

Figure 3:
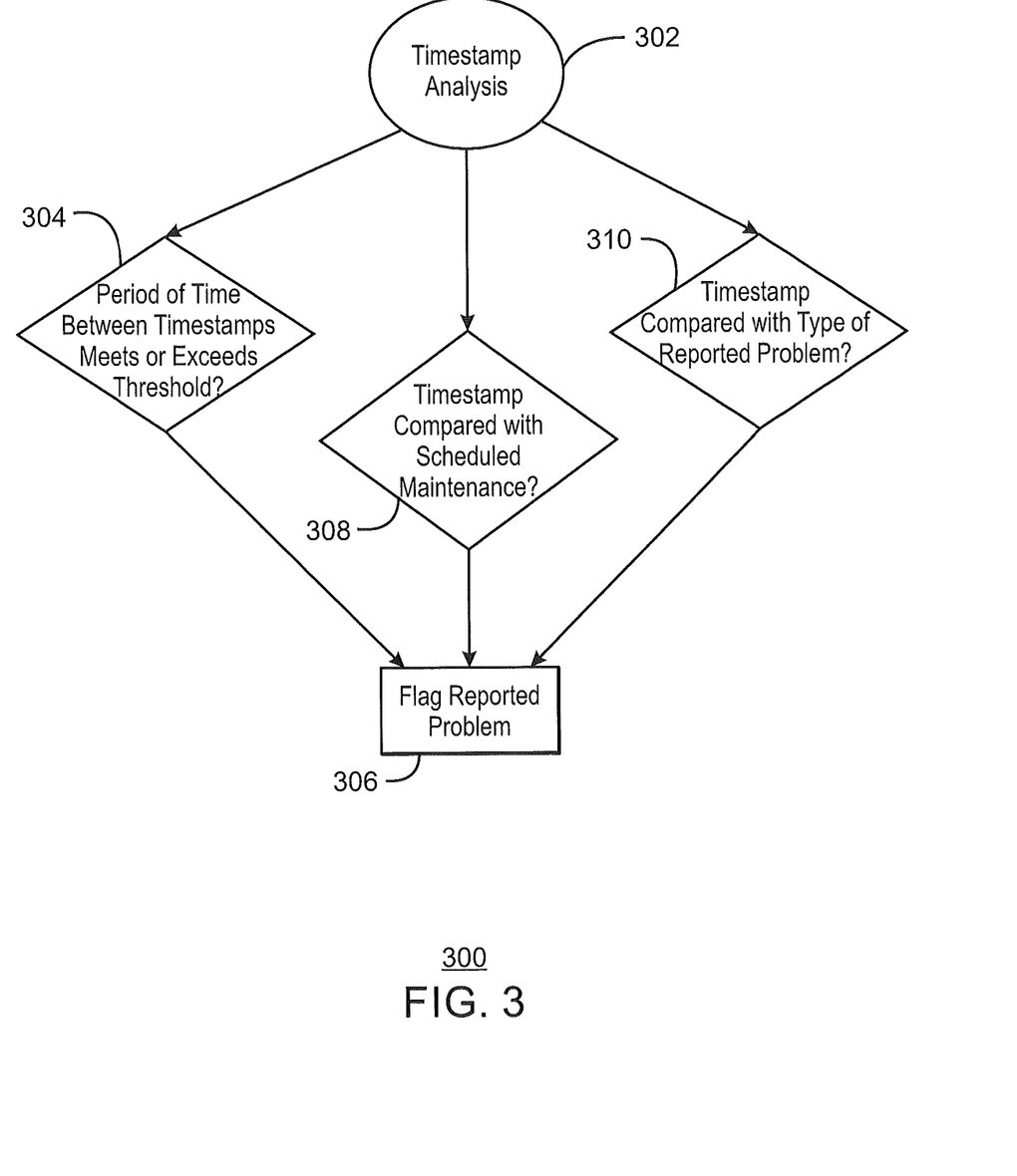
FIG. 3 is a flow diagram illustrating a determination of an illegitimate problem based on a timestamp analysis in accordance with an embodiment.

FIG. 3 is a flow diagram illustrating a determination of an illegitimate problem based on a timestamp analysis. In embodiments, the metadata and the report data may indicate a time, such as a timestamp, associated with the reported problem. The timestamp analysis may begin at block 302. In embodiments, the timestamp analysis at block 302 may begin as a result of geo-location data being determined as consistent at block 208 of FIG. 2. However, the timestamp analysis at block 302 may begin independent of any other analysis including the geo-location analysis discussed in relation to FIG. 2.

The timestamp analysis may include different processes as indicated in FIG. 3. For example, at block 304, the analysis may determine whether the timestamp indicates a period of time has passed between the time the image was taken and the time the problem was reported, wherein the period of time meets or exceeds a threshold predetermined to be associated with illegitimate reported problems. The predetermined threshold may be determined by an administrator of the system. For example, the predetermined threshold may be assigned to be a period of six months prior to the time the problem was reported. If the metadata indicates, via a time stamp for example, that the image data was captured at least six months prior to the time the problem was reported, then the reported problem may be determined to be an illegitimately reported problem.

In some embodiments, the predetermined threshold is set based on a type of reported problem. For example, a reported problem indicating graffiti may have a relatively longer predetermined threshold in relation to a reported problem indicating a broken water main because a broken water main is likely to be reported and fixed much faster. Therefore, the system may compare the metadata including the timestamp of the image with a predetermined threshold based on the type of problem being reported.

In embodiments, the timestamp data may indicate that the reported problem has already been scheduled to be addressed. At block 308, the timestamp is compared with scheduled maintenance in view of the type of problem reported. For example, a reported problem may indicate that trash has not been collected. However, scheduled maintenance may indicate that trash is scheduled to be collected later that day, or later that week. Therefore, the timestamp data may be analyzed to determine the day of the week, and even the time of day, such that illegitimately reported problems, including unjustified problems may be flagged at block 306.

In embodiments, the timestamp data may indicate that the image data does not accurately reflect the reported problem based on the time of day the image data was captured. At block 310, the timestamp data may be compared with the type of problem reported. For example, a reported problem may indicate that a street light is burnt out. However, the timestamp data associated with the image may indicate that the image was taken during the middle of the day when a burnt out street light is not visible. In this scenario, the reported problem may be flagged, at block 306, as possibly being illegitimate based on the time of day.

Figure 4:
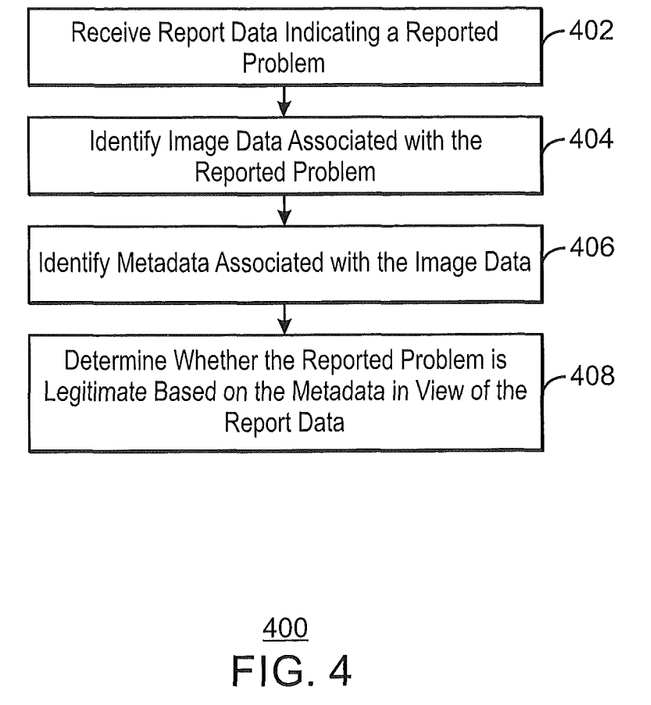
FIG. 4 is a block diagram illustrating a method for determining whether a reported problem is legitimate in accordance with an embodiment.

FIG. 4 is a block diagram illustrating a method for determining whether a reported problem is legitimate. Report data indicating a reported problem is received at block 402. The report data may be received via a web-form for example configured to enable users of the method to report problems. At block 404, image data associated with the reported problem are identified. The image data may include digital photographs, video images, or any other image data having metadata. At block 406, metadata associated with the image data is identified. The metadata may include geo-location data, timestamp data, any combination thereof, and any other metadata useful for determining the legitimacy of the reported problem. At block 408, whether the reported problem is legitimate based on the metadata in view of the report data is determined.

In embodiments, the method may include prioritizing reported problems based on whether a reported problem is legitimate, or how the legitimacy determination was made. For example, timestamp data may indicate that an image associated with a reported pothole was taken over a year ago, and the reported problem may be flagged as illegitimate. However, timestamp data of another image of a pothole may indicate that the image was captured two months ago. In this scenario, the reported problem associated with the most recent timestamp may be investigated first. Further, the presence or lack of a flag in general may be used to prioritize reported problems.

In embodiments, the reported problem may be validated based on the image data being flagged. For example, a given reported problem may be flagged as possibly illegitimate, but may be manually reviewed and validated as illegitimate.

Figure 5:
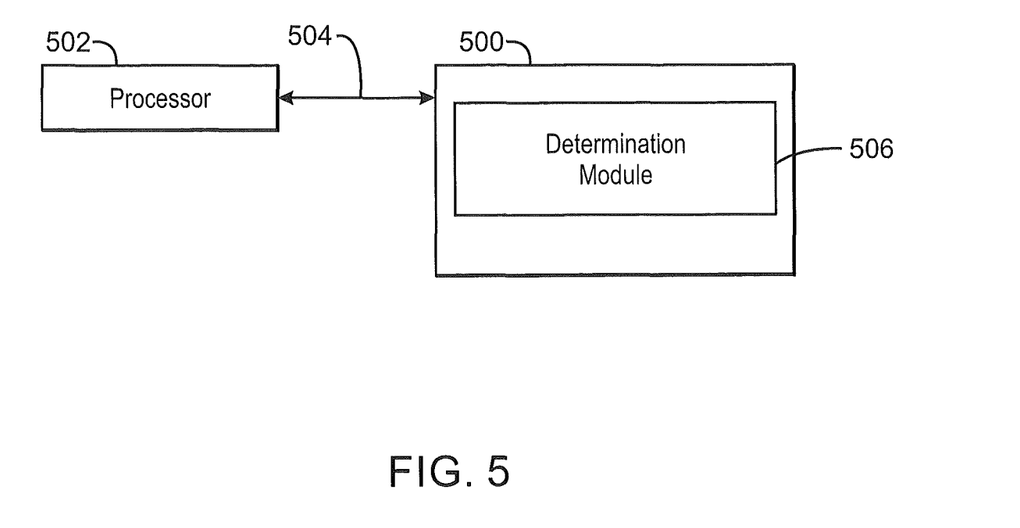
FIG. 5 is a block diagram depicting an example of a computer-readable medium that can be used to determine legitimacy of a reported problem in accordance with an embodiment.

FIG. 5 is a block diagram depicting an example of a computer-readable medium that can be used to determine legitimacy of a reported problem. The computer-readable medium 500 may be accessed by a processor 502 over a computer bus 504. Furthermore, the computer-readable medium 500 may include computer-executable instructions to direct the processor 502 to perform the steps of the current method.

The various software components discussed herein may be stored on the computer-readable medium 500, as indicated in FIG. 5. For example, a determination module 506 may be configured to receive report data indicating a reported problem and identify image data associated with the reported problem. The determination module 506 may identify metadata associated with the image data and determine whether the reported problem is legitimate based on the metadata in view of the report data.

Technical effects and benefits include techniques for determining legitimacy of a received problem report. When the problem report is received, report data and image data are identified, and metadata associated with the image data is identified. The system determines the legitimacy of the problem report from the metadata in view of the report data.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
   receiving, via a computer processor, report data indicating a reported problem;
   identifying image data associated with the reported problem;
   identifying metadata associated with the image data; and
   determining, via the computer processor, a legitimacy of the reported problem based on the metadata in view of the report data, wherein the determining the legitimacy based on the metadata comprises determining whether the metadata indicates a geo-location of the report data based on a distance threshold.

2. The method of claim 1, wherein determining the legitimacy based on the metadata further comprises:
   determining whether the metadata indicates a timestamp associated with the image data indicating an illegitimately reported problem.

3. The method of claim 2, wherein a timestamp indicates an illegitimately reported problem when the timestamp indicates at least one of:
   a period of time has passed between the time the image was taken and the time the problem was reported, wherein the period of time meets or exceeds a threshold predetermined to be associated with illegitimate reported problems;
   the reported problem has already been scheduled to be addressed; and
   the image data does not accurately reflect the reported problem based on the time of day the image data was captured.

4. The method of claim 3, wherein the predetermined threshold is set based on a type of reported problem.

5. The method of claim 1, comprising: flagging image data if the metadata indicates the reported problem is illegitimate.

6. The method of claim 5, comprising validating whether the reported problem is illegitimate based on the image data being flagged.

7. The method of claim 5, wherein reported problems are prioritized based on the presence or lack of a flag of the image data.

8. The method of claim 1, wherein the problem is reported as a part of a municipality reporting system.

9. A computing device, comprising:
   a storage device;
   a processor;
   the storage device having instructions that when executed by the processor, cause the computing device to:
      receive report data indicating a reported problem;
      identify image data associated with the reported problem;
      identify metadata associated with the image data; and
      determine a legitimacy of the reported problem based on the metadata in view of the report data, wherein the determining the legitimacy based on the metadata comprises determining whether the metadata indicates a geo-location of the report data based on a distance threshold.

10. The computing device of claim 9, wherein determining the legitimacy based on the metadata further comprises:
    determining whether the metadata indicates a timestamp associated with the image data indicating an illegitimately reported problem.

11. The computing device of claim 10, wherein a timestamp indicates an illegitimately reported problem when the timestamp indicates at least one of:
    a period of time has passed between the time the image was taken and the time the problem was reported, wherein the period of time meets or exceeds a threshold predetermined to be associated with illegitimate reported problems;
    the reported problem has already been scheduled to be addressed;
    the image data does not accurately reflect the reported problem based on the time of day the image data was captured.

12. The computing device of claim 11, wherein the predetermined threshold is set based on a type of reported problem.

13. The computing device of claim 9, comprising: flagging image data if the metadata indicates the reported problem is illegitimate.

14. The computing device of claim 13, comprising validating whether the reported problem is illegitimate based on the image data being flagged.

15. The computing device of claim 13, wherein reported problems are prioritized based on the presence or lack of a flag of the image data.

16. The computing device of claim 9, wherein the problem is reported as part of a municipality reporting system.

17. A computer program product comprising a computer-readable storage medium having program code embodied therewith, the program code executable by a processor to perform operations, comprising:
   receiving report data indicating the reported problem;
   identifying image data associated with the reported problem;
   identifying metadata associated with the image data; and
   determining a legitimacy of the reported problem based on the metadata in view of the report data, wherein the determining the legitimacy based on the metadata comprises determining whether the metadata indicates a geo-location of the report data based on a distance threshold.

18. The computer program product of claim 17, wherein determining the legitimacy based on the metadata further comprises:
   determining whether the metadata indicates a timestamp associated with the image data indicating an illegitimately reported problem.

19. The computer program product of claim 18, wherein a timestamp indicates an illegitimately reported problem when the timestamp indicates at least one of:
   a period of time has passed between the time the image was taken and the time the problem was reported, wherein the period of time meets or exceeds a threshold predetermined to be associated with illegitimate reported problems;
   the reported problem has already been scheduled to be addressed; and
   the image data does not accurately reflect the reported problem based on the time of day the image data was captured.

20. The computer program product of claim 19, wherein the predetermined threshold is set based on a type of reported problem.

* * * * *